(12) United States Patent
Zhang

(10) Patent No.: US 12,489,178 B2
(45) Date of Patent: Dec. 2, 2025

(54) BUSBAR ASSEMBLY AND CYLINDRICAL POWER BATTERY MODULE

(71) Applicant: EVE POWER CO., LTD., Hubei (CN)

(72) Inventor: Guojiang Zhang, Hubei (CN)

(73) Assignee: EVE POWER CO., LTD., Hubei (CN)

( * ) Notice: Subject to any disclaimer, the term of this patent is extended or adjusted under 35 U.S.C. 154(b) by 0 days.

(21) Appl. No.: 18/667,012

(22) Filed: May 17, 2024

(65) Prior Publication Data

US 2024/0304952 A1 Sep. 12, 2024

Related U.S. Application Data

(63) Continuation of application No. 18/016,071, filed as application No. PCT/CN2022/126887 on Oct. 24, 2022, now Pat. No. 12,015,173.

(30) Foreign Application Priority Data

Jan. 25, 2022 (CN) .......................... 202210088580.9
Jan. 25, 2022 (CN) .......................... 202220207020.6

(51) Int. Cl.
*H01M 50/507* (2021.01)
*H01M 10/42* (2006.01)
(Continued)

(52) U.S. Cl.
CPC ....... *H01M 50/507* (2021.01); *H01M 10/637* (2015.04); *H01M 50/213* (2021.01);
(Continued)

(58) Field of Classification Search
CPC ............ H01M 50/507; H01M 50/519; H01M 50/262; H01M 50/509; H01M 50/522;
(Continued)

(56) References Cited

U.S. PATENT DOCUMENTS

2017/0288200 A1 10/2017 Peng et al.
2019/0296407 A1* 9/2019 Newman ........... H01M 10/6555
(Continued)

FOREIGN PATENT DOCUMENTS

CN 2781578 5/2006
CN 103855353 A 6/2014
(Continued)

OTHER PUBLICATIONS

Japanese Patent Office, Decision of Refusal for Application No. 2023-533283 report issue date Aug. 7, 2024, 10 pages.
(Continued)

*Primary Examiner* — Christopher P Domone
(74) *Attorney, Agent, or Firm* — McDonald Hopkins LLC

(57) ABSTRACT

Provided are a busbar assembly and a cylindrical power battery module. The busbar assembly is used for electrical connection of a cylindrical power battery module. The cylindrical power battery module includes an input copper bar, an output cooper bar and a cells contact system assembly having the corresponding number as submodules. The input copper bar is connected to a cell unit at an input terminal of the cylindrical power battery module, the output copper bar is connected to a cell unit at an output terminal of the cylindrical power battery module.

16 Claims, 4 Drawing Sheets

(51) Int. Cl.
  *H01M 10/637*    (2014.01)
  *H01M 50/213*    (2021.01)
  *H01M 50/262*    (2021.01)
  *H01M 50/509*    (2021.01)
  *H01M 50/519*    (2021.01)
  *H01M 50/522*    (2021.01)
  *H01M 50/583*    (2021.01)

(52) U.S. Cl.
  CPC ....... *H01M 50/262* (2021.01); *H01M 50/509* (2021.01); *H01M 50/519* (2021.01); *H01M 50/522* (2021.01); *H01M 50/583* (2021.01); *H01M 10/425* (2013.01); *H01M 2010/4271* (2013.01); *H01M 2200/105* (2013.01)

(58) Field of Classification Search
  CPC ............. H01M 50/213; H01M 50/583; H01M 10/637; H01M 10/425; H01M 2010/4271; H01M 2200/105
  See application file for complete search history.

(56) References Cited

U.S. PATENT DOCUMENTS

| | | |
|---|---|---|
| 2023/0048671 A1 | 2/2023 | Kawanishi et al. |
| 2023/0216147 A1 | 7/2023 | Yoon et al. |

FOREIGN PATENT DOCUMENTS

| | | |
|---|---|---|
| CN | 109301143 | 2/2019 |
| CN | 210296552 | 4/2020 |
| CN | 112599929 | 4/2021 |
| CN | 213340646 U | 6/2021 |
| CN | 113764832 A | 12/2021 |
| CN | 114566764 A | 5/2022 |
| EP | 2823522 B1 | 4/2020 |
| JP | 2012136238 | 7/2012 |
| JP | 2012138239 | 7/2012 |
| JP | 2013073929 | 4/2013 |
| JP | 2013525942 | 6/2013 |
| JP | 2019029309 A | 2/2019 |
| JP | 2019186001 A | 10/2019 |
| WO | 2019244402 | 2/2019 |
| WO | 2020066055 | 2/2019 |
| WO | 2019244412 | 3/2019 |

OTHER PUBLICATIONS

International Search Report mailed Jan. 19, 2023; International Patent Application No. PCT/CN2022/126887 filed Oct. 24, 2022. ISA/CN.

Written Opinion mailed Jan. 19, 2023; International Patent Application No. PCT/CN2022/126887 filed Oct. 24, 2022. ISA/CN.

Extended European Search Report for Application 22826576.5, PCT/CN2022/126887 dated Apr. 15, 2024, 23 pgs., European Patent Office, Germany.

Office Action issued Apr. 30, 2025; Korean Patent Application No. 10-2023-702179 filed Jun. 26, 2023. 29 pages.

* cited by examiner

BUSBAR ASSEMBLY AND CYLINDRICAL POWER BATTERY MODULE

CROSS-REFERENCE TO RELATED APPLICATION(S)

This is a Continuation Application of U.S. patent application Ser. No. 18/016,071 filed on Aug. 3, 2023 which is a U.S. National Stage Application of International Patent Application No. PCT/CN2022/126887, filed on Oct. 24, 2022, which claims priority to Chinese Patent Application No. 202210088580.9 filed on Jan. 25, 2022 and claims priority to Chinese Patent Application No. 202220207020.6 filed on Jan. 25, 2022, disclosures of which are incorporated herein by reference in their entireties.

TECHNICAL FIELD

The present application relates to the field of battery technologies, for example, a busbar assembly and a cylindrical power battery module.

BACKGROUND

A large cylindrical power battery (such as a cylindrical battery with poles on the same side) module mostly uses wire harnesses to connect a flexible printed circuit (FPC), a negative temperature coefficient (NTC) thermistor and a battery management system (BMS) so as to collect voltage signals and temperature signals of the large cylindrical power battery module. However, the manner of collecting voltage signals and temperature signals through wire harnesses requires a relatively large number of wire harnesses which occupy a large space, and temperature sensors usually need to be crimped with the wire harnesses, so that the assembly process of the large cylindrical power battery module is relatively complicated and the labor costs are relatively increased, which is not conducive to industrialized and efficient production. Moreover, when the large cylindrical power battery module needs to be charged quickly at a high rate, the busbar in the large cylindrical power battery module needs to have a relatively high overcurrent capacity; to satisfy the requirement for the relatively high overcurrent capacity, the busbar in the related art is set to be relatively thick, thus occupying a relatively large space.

SUMMARY

The present application provides a busbar assembly and a cylindrical power battery module, so as to solve the problem in the related art of a relatively large space occupied by a busbar in a cylindrical power battery module and low reliability of the busbar connecting multiple cell units.

In a first aspect, an embodiment of the present application provides a busbar assembly for electrical connection of a cylindrical power battery module. The cylindrical power battery module includes at least one submodule, a submodule of the at least one submodule includes multiple cell units, and the busbar assembly includes an input copper bar, an output copper bar and a cells contact system assembly having the corresponding number as the at least one submodule.

The input copper bar is connected to a cell unit at an input terminal of the cylindrical power battery module.

The output copper bar is connected to a cell unit at an output terminal of the cylindrical power battery module.

One submodule of the at least one submodule is correspondingly connected to one cells contact system assembly to form an electrical unit group, at least one of the input copper bar and the output copper bar is a variable cross-section copper bar, the input copper bar and the output copper bar each includes a first end portion and a second end portion, the first end portion of the input copper bar is connected to the cell unit at the input terminal of the cylindrical power battery module, and the first end portion of the output copper bar is connected to the cell unit at the output terminal of the cylindrical power battery module, where a thickness of the first end portion is less than a thickness of the second end portion.

In an embodiment, a conductive unit of the multiple conductive units is provided with a convex portion, and the convex portion forms a first buffer portion.

In an embodiment, a conductive unit of the plurality of conductive units is provided with a convex portion, and the convex portion forms a first buffer portion, where a first fuse structure is disposed on the first buffer portion.

In an embodiment, a cells contact system assembly includes at least one connection piece, the connection piece includes multiple conductive units and multiple connection portions, conductive units disposed adjacently at intervals in a first direction of the multiple conductive units are connected through connection portions of the multiple connection portions, the multiple conductive units are connected in parallel to cell units disposed adjacently in the first direction, and the multiple conductive units are connected in series to cell units disposed adjacently in a second direction.

In an embodiment, the thickness of the connection piece ranges from 0.2 millimeters to 0.4 millimeters.

In an embodiment, the connection piece includes a first insulating layer, and the first insulating layer is disposed on one side of the connection piece facing cell units.

In an embodiment, the cell unit includes a positive electrode and a negative electrode, the negative electrode is disposed on an end face of the cell unit, the positive electrode and the negative electrode are disposed on the same side, the positive electrode includes a cylindrical protrusion, a conductive unit of the multiple conductive units is provided with a first avoiding groove, and the first avoiding groove is capable of avoiding the cylindrical protrusion.

In an embodiment, a connection portion of the multiple connection portions is a planar structure; or, a connection portion of the multiple connection portions is a protruding structure and the connection portion includes a second buffer portion.

In an embodiment, a second fuse structure is disposed on the connection portion; or the second buffer portion is provided with a second fuse structure.

In an embodiment, a conductive unit of the multiple conductive units includes a first connection region and a second connection region, and the first connection region and the second connection region are connected to two cell units disposed adjacently in the first direction, respectively.

In an embodiment, the first connection region and the second connection region have different heights in a third direction.

In an embodiment, the first connection region includes a second insulating layer, the second connection region includes a third insulating layer, the second insulating layer is configured to insulate part other than a connection between the first connection region and a cell unit of the two cell units, and the third insulating layer is configured to insulate part other than a connection between the second connection region and the other cell unit of the two cell units.

In an embodiment, the thickness of the first end portion is less than the thickness of the second end portion, the thickness of the first end portion ranges from 0.2 millimeters to 0.4 millimeters, and the thickness of the second end portion ranges from 3 millimeters and 5 millimeters.

In an embodiment, the first end portion includes input connection portions having the corresponding number as conductive units on the same connection piece.

In an embodiment, the first end portion is a planar structure; or the first end portion is a protruding structure and includes a third buffer portion.

In an embodiment, the first end portion of the output copper bar is provided with a third fuse structure; or a third fuse structure is disposed on the third buffer portion.

In a second aspect, an embodiment of the present application further provides a busbar assembly for electrical connection of a cylindrical power battery module. The cylindrical power battery module includes a plurality of submodules, a submodule of the plurality of submodules comprises a plurality of cell units, and the busbar assembly includes:

an input copper bar, where the input copper bar is connected to a cell unit at an input terminal of the cylindrical power battery module;

an output copper bar, where the output copper bar is connected to a cell unit (100) at an output terminal of the cylindrical power battery module; and a connection copper bar, and the connection copper bar connects adjacent submodules of the plurality of submodules other than the input terminal of the cylindrical power battery module and the output terminal of the cylindrical power battery module;

where the connection copper bar includes a copper bar body and a third end portion and a fourth end portion which are connected to the copper bar body, and the third end portion and the fourth end portion are connected to cell units of the submodules disposed adjacently, respectively.

In an embodiment, the multiple submodules are disposed at intervals in the first direction, the input terminal of the cylindrical power battery module is a cell unit at an end of a first submodule in the first direction of the multiple submodules, and the output terminal of the cylindrical power battery module is a cell unit at an end of a last submodule in the first direction of the multiple submodules.

In an embodiment, the thickness of the third end portion and the thickness of the fourth end portion are each less than the thickness of the copper bar body.

In an embodiment, the thickness of the third end portion and the thickness of the fourth end portion are each range from 0.2 millimeters to 0.4 millimeters, and the thickness of the copper bar body ranges from 3 millimeters to 5 millimeters.

In an embodiment, the third end portion includes third end connection portions having the corresponding number as conductive units on the same connection piece, and the fourth end portion includes fourth end connection portions having the corresponding number as conductive units on the same connection piece.

In an embodiment, at least one of the third end portion and the fourth end portion is a planar structure; or, at least one of the third end portion and the fourth end portion is a protruding structure and at least one of the third end portion and the fourth end portion includes a fourth buffer portion.

In an embodiment, a fourth fuse structure is disposed on the third end portion; or the fourth buffer portion is provided with a fourth fuse structure.

In a third aspect, an embodiment of the present application further provides a cylindrical power battery module. The cylindrical power battery module includes the busbar assembly in any one of the preceding solutions and at least one submodule. Each submodule of the at least one submodule includes multiple cell units, and the busbar assembly is configured to connect the multiple cell units.

In an embodiment, the cylindrical power battery module includes a flexible printed circuit and a battery management system, where the flexible printed circuit is connected to the cells contact system assembly, the flexible printed circuit is provided with an output plug, and the output plug is inserted on the battery management system.

In an embodiment, the cylindrical power battery module further includes a negative temperature coefficient thermistor, where the negative temperature coefficient thermistor is disposed on cell units, and the negative temperature coefficient thermistor is connected to the flexible printed circuit.

In an embodiment, the cylindrical power battery module further includes a plastic bracket disposed between the cells contact system assembly and cell units, and the plastic bracket is configured to secure the input copper bar, the output copper bar and the cells contact system assembly.

The present application has beneficial effects described below.

The present application provides a busbar assembly for circuit connection of a cylindrical power battery module. The cylindrical power battery module includes at least one submodule, and each submodule includes multiple cell units. The busbar assembly includes an input copper bar, an output copper bar and cells contact system assemblies having the corresponding number as the at least one submodule. The input copper bar is connected to a cell unit at an input terminal of the cylindrical power battery module, the output copper bar is connected to a cell unit at an output terminal of the cylindrical power battery module, and one submodule is correspondingly connected to one cells contact system assembly to form an electrical unit group. A cells contact system assembly includes at least one connection piece, and a connection piece includes multiple conductive units and multiple connection portions. Conductive units disposed adjacently at intervals in a first direction are connected through connection portions, the multiple conductive units are connected in parallel to cell units disposed adjacently in the first direction, and the multiple conductive units are connected in series to cell units disposed adjacently in a second direction.

Cell units disposed adjacently in the first direction within one submodule are connected in parallel through connection pieces, so that currents of the cell units disposed adjacently in the first direction are balanced for distribution, and the value of the current passing each cell unit is reduced, so that when the cylindrical power battery module is subjected to high-rate quick charge, the cells contact system assembly can satisfy the requirement of the overcurrent, and the reliability of the connection between the cell units is ensured. Meanwhile, since the value of the current passing each cell unit is relatively small, the thickness of the connection piece can be reduced to save space, so that the energy density of the cylindrical power battery module is improved, and the manufacturing costs of the connection pieces can be reduced.

The present application further provides a cylindrical power battery module. The cylindrical power battery module includes the busbar assembly in the preceding solution and at least one submodule. Each submodule includes multiple cell units, and the busbar assembly is configured to connect the cell units.

The internal structure of the cylindrical power battery module is simple, and the circuit connection between multiple cell units in the cylindrical power battery module can be completed through the input copper bar, the output copper bar and cells contact system assemblies having the corresponding number as the submodules. The reliability of the connection of the cells contact system assemblies is relatively high, and the space utilization rate is high, so that the energy density of the cylindrical power battery module is relatively high.

Figure 1:
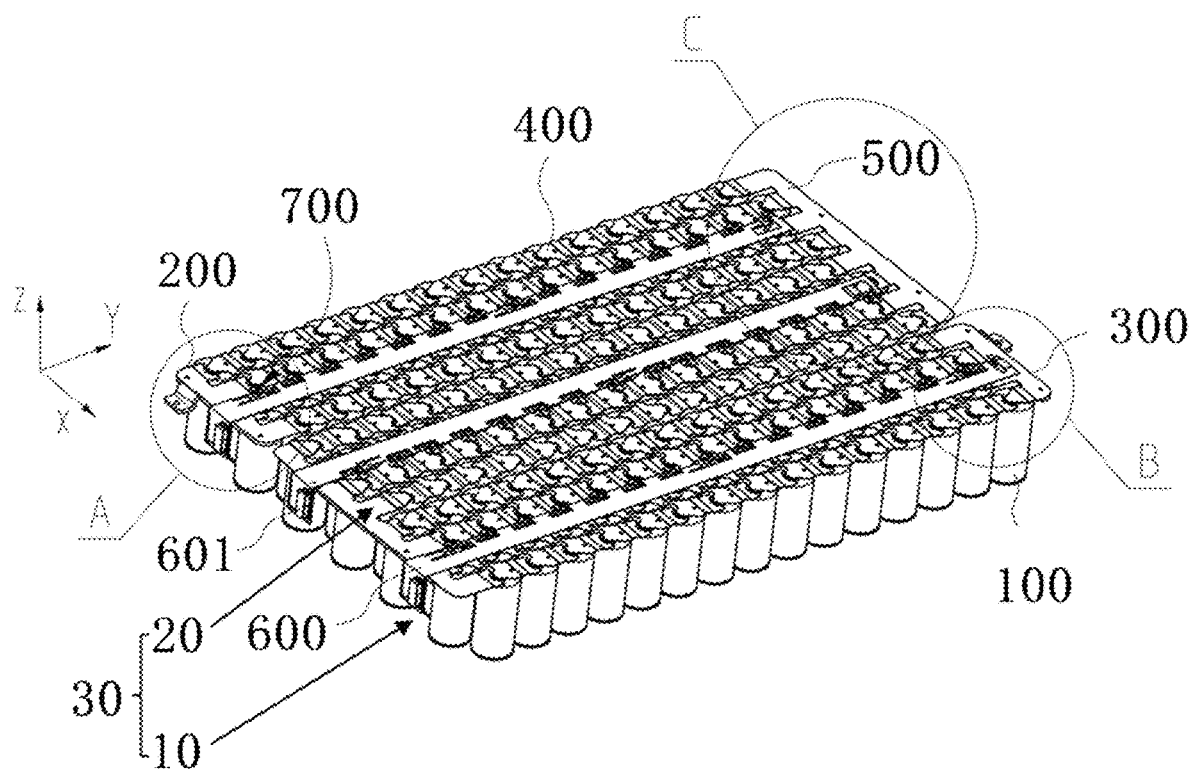
FIG. 1 is a structural view of a busbar assembly connected to cell units according to an embodiment of the present application.

REFERENCE LIST 10 submodule
20 cells contact system assembly
30 electrical unit group
100 cell unit
110 positive electrode
1100 cylindrical protrusion
120 negative electrode
200 input copper
201 first end portion of an input copper
202 second end portion of an input copper
300 output copper
301 first end portion of an output copper
302 second end portion of an output copper
2301 input connection portion
303 third buffer portion
400 connection piece
410 conductive unit
4100 convex portion
411 first buffer portion
4000 first insulating layer
4110 first fuse structure
412 first connection region
4120 second insulating layer
413 second connection region
4130 third insulating layer
414 first avoiding groove
420 connection portion
4200 second buffer portion
500 connection copper bar
501 copper bar body
502 third end portion 5020 third end connection portion
503 fourth end portion
5030 fourth end connection portion
504 fourth buffer portion
600 flexible printed circuit
601 output plug
602 nickel sheet
700 NTC collection point
800 plastic bracket

DETAILED DESCRIPTION

In the description of the present application, unless otherwise expressly specified and limited, the term "connected to each other", "connected" or "secured" is to be construed in a broad sense, for example, as securely connected, detachably connected or integrated; mechanically connected or electrically connected; directly connected to each other or indirectly connected to each other via an intermediary; or internally connected between two elements or interaction relations between two elements. For those of ordinary skill in the art, meanings of the preceding terms can be understood according to situations in the present application.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature, or the first feature is obliquely on, above or over the second feature, or the first feature is simply at a higher level than the second feature. When the first feature is described as "under", "below" or "underneath" the second feature, the first feature is right under, below or underneath the second feature, or the first feature is obliquely under, below or underneath the second feature, or the first feature is simply at a lower level than the second feature.

In the description of this embodiment, the orientation or position relationships indicated by terms "above", "below", "left", "right" and the like are based on the orientation or position relationships shown in the drawings, merely for ease of description and simplifying an operation, and these relationships do not indicate or imply that the referred device or element has a specific orientation and is constructed and operated in a specific orientation. In addition, the terms "first" and "second" are used only for distinguishing between descriptions and have no special meaning.

Figure 2:
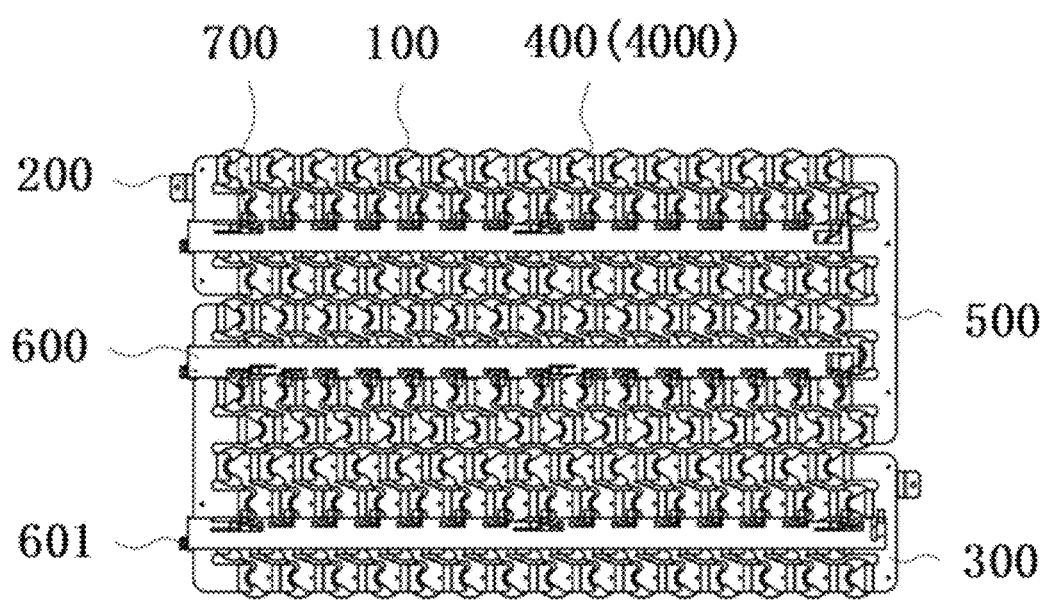
FIG. 2 is a top view of a busbar assembly connected to cell units according to an embodiment of the present application.

As shown in FIG. 1 and FIG. 2, the embodiment provides a busbar assembly for electrical connection of a cylindrical power battery module (for example, the cylindrical power battery module is a large cylindrical power battery module). The cylindrical power battery module includes at least one submodule 10, a submodule 10 includes multiple cell units 100 disposed adjacently, the multiple cell units 100 are arranged in an array in a first direction and a second direction, and intervals exist between the multiple cell units 100. The first direction is the direction of X axis in FIG. 1, and the second direction is the direction of Y axis in FIG. 1.

In an embodiment, the first direction is different from the second direction; optionally, the first direction is perpendicular to the second direction.

In some embodiments, one submodule 10 is provided, and an input terminal of the cylindrical power battery module is a cell unit 100 at a first end of the submodule 10, and an output terminal of the cylindrical power battery module is a cell unit 100 at a second end of the submodule 10. The busbar assembly disposed in the cylindrical power battery module includes an input copper bar 200, an output copper bar 300 and cells contact system (CCS) assemblies 20 having the corresponding number as the submodule 10. The input copper bar 200 is connected to a cell unit 100 at the input terminal of the cylindrical power battery module. It is to be noted that when the input copper bar 200 is connected to a positive electrode 110 of a cell unit 100 at an input terminal of the submodule 10, the output copper bar 300 is connected to a negative electrode 120 of a cell unit 100 at an output terminal of the submodule 10; when the input copper bar 200 is connected to a negative node 120 of the cell unit 100 at the input terminal of the submodule 10, the output copper bar 300 is connected to a positive electrode 110 of the cell unit 100 at the output terminal of the submodule 10. For ease of description, the solution is used where the input copper bar 200 is connected to the negative electrode 120 of the cell unit 100 at the input terminal, and the output copper bar 300 is connected to the positive electrode 110 of the cell unit 100 at the output terminal. The output copper bar 300 is connected to the cell unit 100 at the output terminal of the cylindrical power battery module. Each CCS assembly 20 includes at least one connection piece 400, a connection piece 400 includes multiple conductive units 410 and multiple connection portions 420. Conductive units 410 disposed adjacently at intervals in the first direction are connected through connection portions 420, the multiple conductive units 410 are connected in parallel to cell units 100 disposed adjacently in the first direction, and the multiple conductive units 410 are connected in series to cell units 100 disposed adjacently in the second direction.

Therefore, the cell units 100 disposed adjacently in the second direction in the submodule 10 can be connected in series into the same row by the conductive units 410 disposed adjacently in the second direction through the connection piece 400, and the cell units 100 disposed adjacently in the first direction in the submodule 10 can be connected in parallel through the connection piece 400. In this manner, currents of the multiple cell units 100 connected in parallel in the first direction are balanced for distribution, and the value of the current passing each cell unit 100 is reduced, so that when the cylindrical power battery module is subjected to high-rate quick charge, the CCS assembly 20 can satisfy the requirement of the overcurrent, and the reliability of the connection between the cell units 100 is ensured. Meanwhile, since the value of the current passing each cell unit 100 is relatively small, the thickness of the connection piece 400 can be reduced to save space, so that the energy density of the cylindrical power battery module is improved.

In an optional embodiment, the number of connection pieces 400 in the CCS assembly 20 and the number of conductive units 410 in each connection piece 400 fit the number of cell units 100 in the submodule 10.

Figure 3:
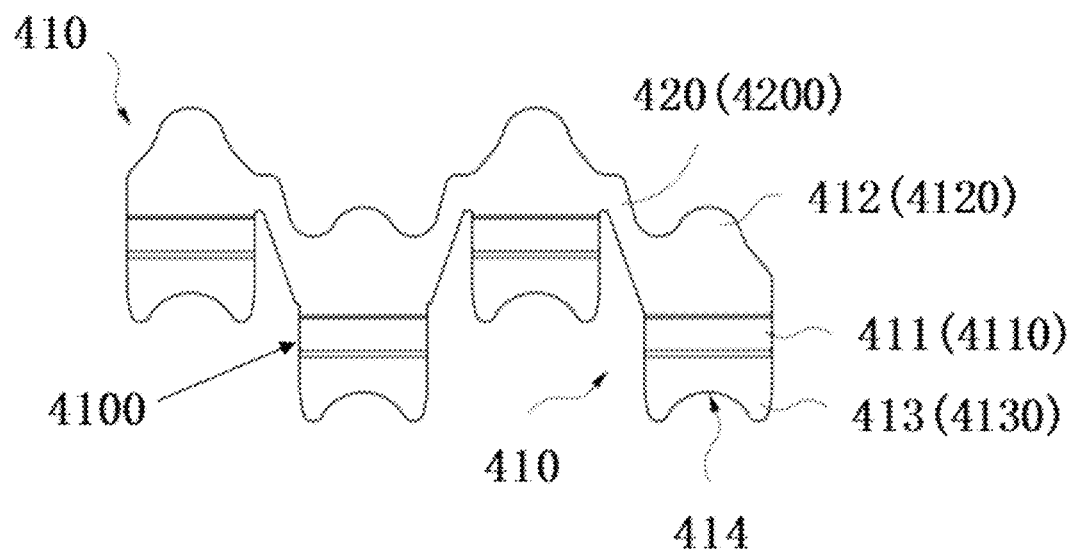
FIG. 3 is a structural view of a connection piece according to an embodiment of the present application.

Optionally, as shown in FIG. 3, a conductive unit 410 in the embodiment includes a first connection region 412 and a second connection region 413, and the first connection region 412 and the second connection region 413 are connected to two cell units 100 disposed adjacently in the first direction, respectively. For ease of description, the two adjacent cell units 100 are defined here as a first cell and a second cell, and a positive electrode 110 and a negative electrode 120 of the first cell and a positive electrode 110 and a negative electrode 120 of the second cell are disposed on the same side. Exemplarily, the first connection region 412 is connected to the positive electrode 110 of the first cell, and the second connection region 413 is connected to the negative electrode 120 of the second cell, so that the series connection between multiple cell units 100 disposed in the second direction is achieved.

Figure 8:
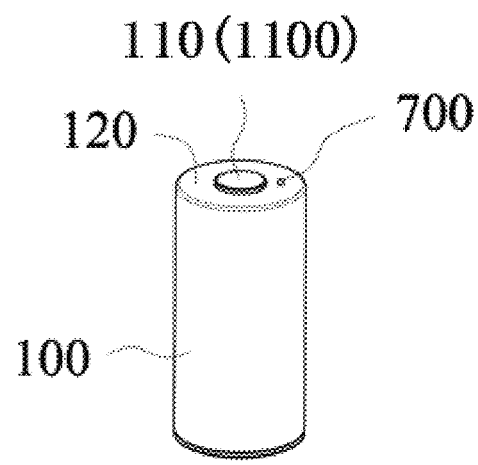
FIG. 8 is a structural view of a cell unit according to an embodiment of the present application.

Referring to FIG. 8, a cell unit 100 includes a positive electrode and a negative electrode 120. The negative electrode 120 is disposed on an end face of the cell unit 100, and a cylindrical protrusion 1100, which is part of the positive electrode 110, is disposed at the center of the end face. Since the positive electrode 110 of the cell unit 100 is higher than the negative electrode 120 of the cell unit 100, in the embodiment, the height of the first connection region 412 is set to be different from the height of the second connection region 413 in a third direction. The third direction is the direction of Z axis in FIG. 1. In the direction of Z axis, the first connection region 412 is higher than the second connection region 413 to fit the height difference between the positive electrode 110 and the negative electrode 120; therefore, the situation is prevented where the cell unit 100 shakes during use of the cylindrical power battery module, causing the connection piece 400 to be wrinkled or even broken under long-term tensile force or pressure, and thus reducing the reliability of the connection between the cell units 100 of the cylindrical power battery module.

In an embodiment, the third direction is different from the first direction and the second direction; optionally, the first direction and the second direction are each perpendicular to the second direction.

Optionally, to avoid the positive electrode 110 of the cell unit 100, in the embodiment, the conductive unit 410 is further provided with a first avoiding groove 414, and the first avoiding groove 414 is an arc-shaped notch matching the cylindrical protrusion 1100 of the positive electrode 110. With the arrangement of the first avoiding groove 414, on the one hand, the connection area between the second connection region 413 and the negative electrode 120 is increased, so that the reliability of the connection between the second connection region 413 and the negative electrode 120 is improved, and the poor connection is unlikely to occur; on the other hand, the first avoiding groove 414 can also serve as a limit to prevent the connection piece 400 from falling off or shifting.

In some embodiments, the conductive unit 410 may be disposed as a planar structure, and the connection piece 400 of a preset shape is manufactured through cutting; this processing method is easy to perform and has high manufacturing efficiency and relatively low costs. Of course, in other embodiments, the conductive unit 410 may be cast through a mold, as long as the preset shape can be manufactured. A first fuse structure 4110 is disposed on the conductive unit 410, and the first fuse structure 4110 is disposed at the connection between the first connection region 412 and the second connection region 413. The first fuse structure 4110 includes a first current limiting hole provided at the connection between the first connection region 412 and the second connection region 413, and at least one first current limiting hole may be provided according to actual requirements. The arrangement of the first current limiting hole reduces the cross-section area of the connection between the first connection region 412 and the second connection region 413 on the conductive unit 410, so that the first connection region 412 and the second connection region 413 are disconnected when the circuit is overloaded, thus the circuit is protected, and the safety performance of the cylindrical power battery is improved.

Optionally, the first fuse structure 4110 further includes low-melting-point metal, such as tin, coated at the connection between the first connection region 412 and the second connection region 413. When an extreme situation such as a short circuit occurs in the circuit, the current in the circuit increases rapidly, the increase of the current causes the temperature of the circuit to increase, and the increase of the temperature causes the low-melting-point metal to melt; after the low-melting-point metal melts, the substrate of the conductive unit 410 becomes brittle and easily breaks, so that the first connection region 412 and the second connection region 413 are quickly disconnected at relatively high response speed; therefore, the circuit in the second direction is quickly cut off, and thus the damage to the cell units 100 disposed adjacently in the second direction is prevented.

Of course, in other embodiments, the conductive unit 410 is provided with a convex portion 4100, the convex portion 4100 of the conductive unit 410 forms a first buffer portion 411, and two ends of the first buffer portion 411 are connected to the first connection region 412 and the second connection region 413, respectively. Through the arrangement of the first buffer portion 411, a buffer effect is achieved on the expansion force, the tolerance and the displacement between the cell units 100 disposed adjacently in the second direction, so that the conductive unit 410 is prevented from being broken, the toughness of the conductive unit 410 is improved, and the reliability of the connection is high. Optionally, the convex portion 4100 of the conductive unit 410 is disposed in a "n" shape. The convex portion 4100 of the conductive unit 410 may be manufactured in a pressing manner; this manufacturing method is easy and brings a good buffering effect.

Exemplarily, the first fuse structure 4110 may be disposed at the first buffer portion 411. When the circuit temperature becomes too high due to an extreme situation such as a short circuit occurring in the circuit, the first fuse structure 4110 fuses due to the heat generated by the first fuse structure 4110 itself, and the circuit connection between the cell units 100 disposed adjacently in the second direction is quickly disconnected, so that the cell units 100 are protected. The first fuse structure 4110 includes a first current limiting hole provided at the first buffer portion 411, and at least one first current limiting hole may be provided according to actual requirements. The arrangement of the first current limiting hole reduces the cross-section area of the first buffer portion 411 on the conductive unit 410, so that the conductive units 410 are disconnected when the circuit is overloaded, thus the circuit is protected, and the safety performance of the cylindrical power battery is improved. Optionally, low-melting-point metal, such as tin, may be coated at the first buffer portion 411, so that it is ensured that the first connection region 412 and the second connection region 413 are quickly disconnected at relatively high response speed; therefore, the damage to the cell units 100 disposed adjacently in the second direction is prevented.

Optionally, in some embodiments, the connection portion 420 is a planar structure. The size of the connection portion 420 is much smaller than the size of the conductive unit 410, so that a narrow neck is formed between adjacent conductive units 410. The narrow neck itself can be used as a second fuse structure. When an extreme situation such as a short circuit occurs in the circuit, the narrow neck will fuse due to the concentration of thermal stress, so that the current in the circuit is cut off, the circuit is protected, the cell units 100 disposed adjacently in the first direction are prevented from being damaged, and thus the loss is reduced and the costs are saved; in addition, the large cylindrical battery with problems can be quickly located for later maintenance and replacement. Of course, in other embodiments, the second fuse structure further includes low-melting-point metal, such as tin, coated at the narrow neck.

In an implementation solution, the connection portion 420 may also be provided with a protruding structure, and the protruding structure of the connection portion 420 is a second buffer portion 4200. Through the arrangement of the second buffer portion 4200, a buffer effect is achieved on the expansion force, the tolerance and the displacement between the cell units 100 disposed adjacently in the first direction, so that the connection portion 420 is prevented from being broken, the toughness of the connection portion 420 is improved, the reliability of the connection is high. Optionally, the protruding structure of the connection portion 420 is disposed in a "n" shape. The protruding structure of the connection portion 420 may be manufactured in a pressing manner; this manufacturing method is easy and brings a good buffering effect.

Exemplarily, the second fuse structure may be disposed at the second buffer portion 4200. The second fuse structure includes a second current limiting hole provided at the connection portion 420, and one or more second current limiting holes may be provided according to actual requirements. The arrangement of the second current limiting hole reduces the cross-section area of the connection portion 420, so that the connection portion 420 is disconnected when the circuit is overloaded, thus the circuit is protected, and the safety performance of the cylindrical power battery is improved. Optionally, the second fuse structure further includes low-melting-point metal, such as tin, coated at the connection portion 420. When an extreme situation such as a short circuit occurs in the circuit, the current in the circuit increases rapidly, and the resulting increase of the temperature causes the low-melting-point metal to melt; after the low-melting-point metal melts, the substrate of the connection portion 420 becomes brittle and easily breaks, so that the circuit connection in the first direction is quickly disconnected; therefore, the damage to the cell units 100 disposed adjacently in the first direction is prevented.

Optionally, the conductive unit 410 of the connection piece 400 is integrally formed with the connection portion 420 of the connection piece 400, and the thickness of the conductive unit 410 is the same as the thickness of the connection portion 420. The thickness of the connection piece 400 is set to range from 0.2 millimeters to 0.4 millimeters (0.2 mm to 0.4 mm). Exemplarily, the thickness of the connection piece 400 is set to 0.2 mm, 0.25 mm, 0.3 mm, 0.35 mm, 0.4 mm, etc. Of course, in other embodiments, the thickness of the connection piece 400 may also be set as other values within this range.

Preferably, the connection piece 400 includes a first insulating layer 4000, a second insulating layer 4120 and a third insulating layer 4130. The first insulating layer 4000 is disposed on one side of at least one of the first buffer portion 411 and the second buffer portion 4200 facing cell units 100; the second insulating layer 4120 is disposed at the first connection region 412, and the second insulating layer 4120 is disposed to insulate part other than the connection between the first connection region 412 and the cell unit 100; the third insulating layer 4130 is disposed at the second connection region 413, and the third insulating layer 4130 is disposed to insulate part other than the connection between the second connection region 413 and the cell unit 100. The first insulation layer 4000, the second insulating layer 4120 and the third insulating layer 4130 are set, so that the cell unit 100 is prevented from being short-circuited, and the safety of the circuit connection is relatively high.

Figure 4:
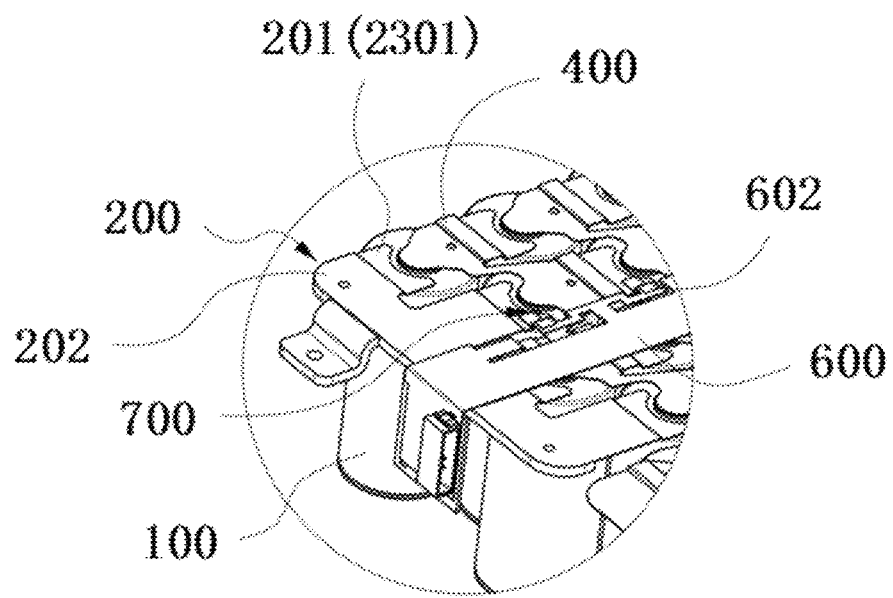
FIG. 4 is a partial enlarged view of part A in FIG. 1.

As shown in FIG. 4, the input copper bar 200 is a variable cross-section copper bar including a first end portion 201 of the input copper bar and a second end portion 202 of the input copper bar. The first end portion 201 of the input copper bar is connected to the cell unit 100 at the input terminal of the cylindrical power battery module, and the thickness of the first end portion 201 of the input copper bar is less than the thickness of the second end portion 202 of the input copper bar. Optionally, the thickness of the first end portion 201 of the input copper bar ranges from 0.2 mm to 0.4 mm, and the thickness of the second end portion 202 of the input copper bar ranges from 3 mm and 5 mm. Exemplarily, the thickness of the first end portion 201 of the input copper bar may be set to 0.2 mm, 0.25 mm, 0.3 mm, 0.35 mm, 0.4 mm, etc. Of course, in other embodiments, the thickness of the first end portion 201 of the input copper bar may also be set as other values within this range. The thickness of the second end portion 202 of the input copper bar is 3 mm, 3.5 mm, 4 mm, 4.5 mm, 5 mm, etc. Of course, in other embodiments, the thickness of the second end portion 202 of the input copper bar may also be set as other values within this range.

Optionally, the first end portion 201 of the input copper bar includes input connection portions 2301 having the corresponding number as conductive units 410 on the same connection piece 400. Four conductive units 410 are described as an example in the embodiment. Four input connection portions 2301 are connected to four cell units 100 at the input terminal of the submodule 10, respectively, so as to achieve dispersion of the current at the input copper bar 200. It is to be noted that since the first end portion 201 of the input copper bar is connected to the negative electrode 120 of the cell unit 100, to maintain the overall flatness, the height difference between the first end portion 201 of the input copper bar and the second end portion 202 of the input copper bar may be designed to fit the height difference between the positive electrode 110 of the cell unit 100 and the negative electrode 120 of the cell unit 100.

Optionally, the first end portion 201 of the input copper bar is a planar structure, the first end portion 201 of the input copper bar is provided with a second avoiding groove, and the second avoiding groove is an arc-shaped notch matching the cylindrical protrusion 1100 of the positive electrode 110 of the cell unit 100. The second avoiding groove can avoid the positive electrode 110 of the cell unit 100 connected to the first end portion 201 of the input copper bar, and serves as a limit to prevent the input copper bar from falling off or shifting; moreover, through this arrangement, the connection area between the first end portion 201 of the input copper bar and the negative electrode 120 of the cell unit 100 is increased, so that the reliability of the connection is improved, and the poor connection is unlikely to occur.

Figure 5:
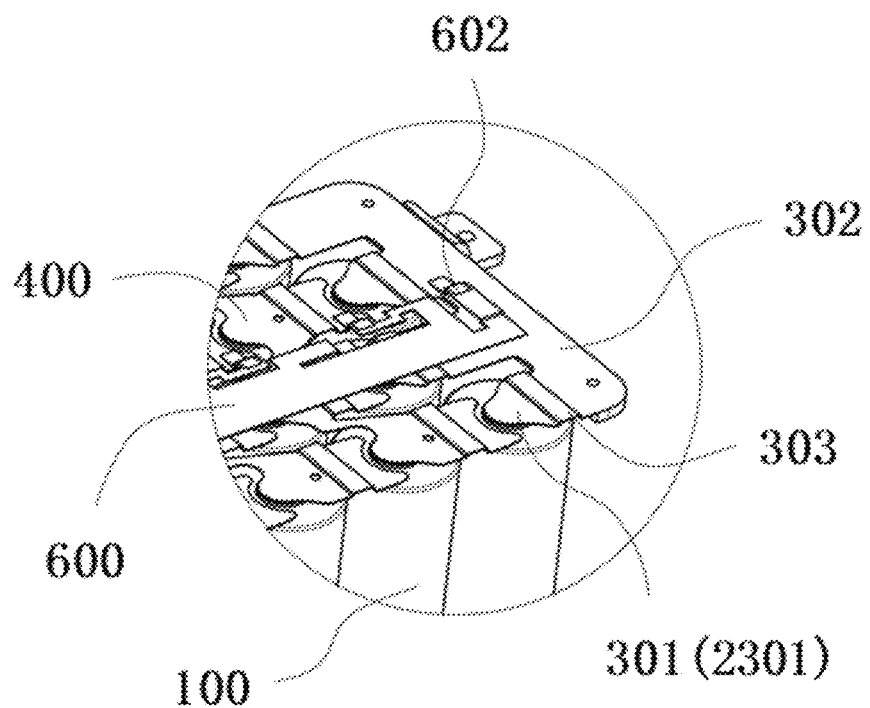
FIG. 5 is a partial enlarged view of part B in FIG. 1.

As shown in FIG. 5, the output copper bar 300 is a variable cross-section copper bar including a first end portion 301 of the output copper bar and a second end portion 302 of the output copper bar. The first end portion 301 of the output copper bar is connected to the cell unit 100 at the output terminal of the cylindrical power battery module, and the thickness of the first end portion 301 of the output copper bar is less than the thickness of the second end portion 302 of the output copper bar. Optionally, the thickness of the first end portion 301 of the output copper bar ranges from 0.2 mm to 0.4 mm, and the thickness of the second end portion 302 of the output copper bar ranges from 3 mm and 5 mm. Exemplarily, the thickness of the first end portion 301 of the output copper bar may be set to 0.2 mm, 0.25 mm, 0.3 mm, 0.35 mm, 0.4 mm, etc. Of course, in other embodiments, the thickness of the first end portion 301 of the output copper bar may also be set as other values within this range. The thickness of the second end portion 302 of the output copper bar is 3 mm, 3.5 mm, 4 mm, 4.5 mm, 5 mm, etc. Of course, in other embodiments, the thickness of the second end portion 302 of the output copper bar may also be set as other values within this range.

Optionally, the first end portion 301 of the output copper bar also includes input connection portions 2301 having the corresponding number as conductive units 410 on the same connection piece 400. Four conductive units 410 are described as an example in the embodiment. Four input connection portions 2301 are connected to four cell units 100 at the output terminal of the submodule 10, respectively, so as to achieve convergence of the current at the output copper bar 300. It is to be noted that since the first end portion 301 of the output copper bar is connected to the positive electrode 110 of the cell unit 100, to maintain the overall flatness, the height difference between the first end portion 301 of the output copper bar and the second end portion 302 of the output copper bar may be designed to fit the height difference between the positive electrode 110 of the cell unit 100 and the negative electrode 120 of the cell unit 100.

In some embodiments, the first end portion 301 of the output copper bar is a planar structure. A third fuse structure includes a third current limiting hole provided at the first end portion 301 of the output copper bar, and one or more third current limiting holes may be provided according to actual requirements. The arrangement of the third current limiting hole reduces the cross-section area of the first end portion 301, so that the input connection portion 2301 fuses due to the concentration of thermal stress when the circuit is overloaded, the current in the circuit is cut off, the circuit is protected, and the safety performance of the cylindrical power battery is improved. Optionally, the third fuse structure further includes low-melting-point metal, such as tin, coated at the first end portion 301 of the output copper bar. When an extreme situation such as a short circuit occurs in the circuit, the low-melting-point metal melts, and thus the substrate of the first end portion 301 of the output copper bar becomes brittle, so that the first end portion 301 of the output copper bar can be quickly disconnected at higher response speed; therefore, the circuit is quickly cut off, and the cell units 100 are protected.

In other embodiments, the first end portion 301 of the output copper bar may also be set as a protruding structure, and the protruding structure of the first end portion 301 of the output copper bar is a third buffer portion 303. Through the arrangement of the third buffer portion 303, a buffer effect is achieved on the expansion force, the tolerance and the displacement between the output copper bar 300 and the cell units 100, so that the reliability of the connection is relatively high. Optionally, the protruding structure of the first end portion 301 of the output copper bar is disposed in a "n" shape and may be manufactured in a pressing manner; this manufacturing method is easy and brings a good buffering effect. Further, the third fuse structure may be disposed at the third buffer portion 303. When the circuit temperature becomes too high due to an extreme situation such as a short circuit occurring in the circuit, the third fuse structure fuses due to the heat generated by the third fuse structure itself, and the circuit connection between the output copper bar 300 and the cell units 100 is quickly disconnected, so that the cell units 100 are protected.

In some embodiments, multiple submodules 10 may be provided, at this time, the CCS assembly 20 further includes a connection copper bar 500, and each submodule 10 is correspondingly connected to one CCS assembly 20 to form an electrical unit group 30. The connection copper bar 500 connects adjacent electrical unit groups 30 other than the input terminal of the cylindrical power battery module and the output terminal of the cylindrical power battery module to form multiple submodules 10. During discharging, the current flows from the input terminal of the cylindrical power battery module sequentially through the submodule 10 where the input terminal of the cylindrical power battery module is located, a connection copper bar 500, the submodule 10 adjacent to the submodule 10 where the input terminal is located, a connection copper bar 500 and the submodule 10 where the output terminal of the cylindrical power battery module is located, and finally flows out through the output terminal of the cylindrical power battery module; and during charging, the flowing direction of the current is opposite. For ease of description, three submodules 10 are described as an example here. As shown in FIG. 1, three submodules 10 are disposed at intervals in the first direction. The input terminal of the cylindrical power battery module is a cell unit 100 at an end of the first submodule 10 in the first direction, the input terminal of the cylindrical power battery module is connected to the input copper bar 200, the output terminal of the cylindrical power battery module is a cell unit 100 at an end of the last submodule 10 in the first direction, and the output terminal of the cylindrical power battery module is connected to the output copper bar 300.

Figure 6:
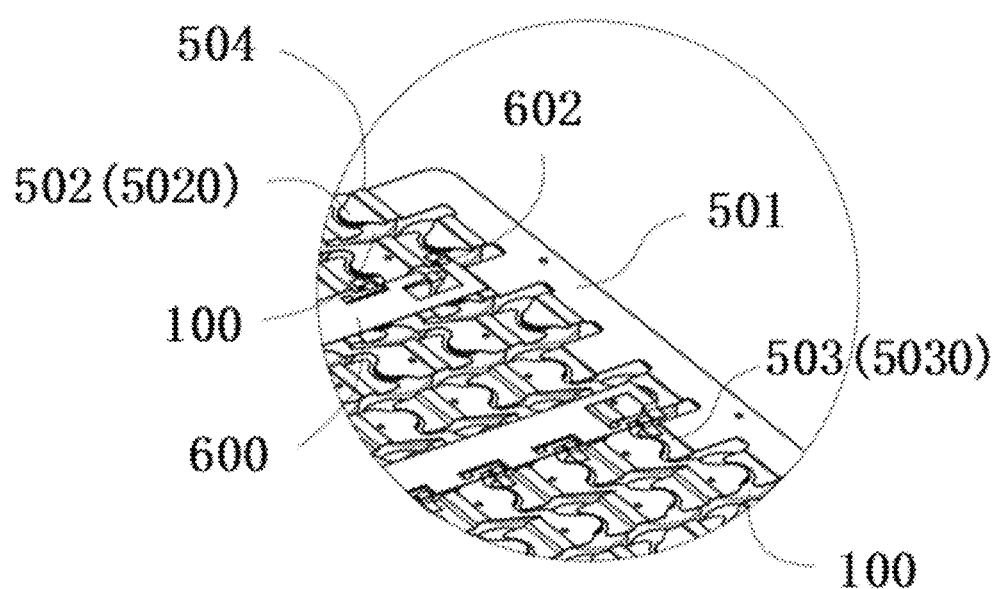
FIG. 6 is a partial enlarged view of part C in FIG. 1.

Optionally, the three submodules 10 are connected by connection copper bars 500. For ease of description, the three submodules 10 are defined as a first module, a second module and a third module. As shown in FIG. 1 and FIG. 6, the process of discharging is described as an example. The input terminal of the cylindrical power battery module is the head end of the first module, and the output terminal of the cylindrical power battery module is the tail end of the third module. In the embodiment, two connection copper bars 500 are used, and the two connecting copper bar 500 each include a copper bar body 501 and a third end portion 502 and a fourth end portion 503 which are connected to the copper bar body 501. For ease of description, the two connection copper bars 500 are defined as a first copper bar and a second copper bar. The third end portion 502 of the first copper bar is connected to the positive electrode 110 of the cell unit 100 at the output terminal of the first module, the fourth end portion 503 of the first copper bar is connected to the negative electrode 120 of the cell unit 100 at the input terminal of the second module, the third end portion 502 of the second copper bar is connected to the positive electrode 110 of the cell unit 100 at the output terminal of the second module, and the fourth end portion 503 of the second copper bar is connected to the negative electrode 120 of the cell unit 100 at the input terminal of the third module. Through the arrangement of connection copper bars 500, the three submodules 10 are connected together in series, so that stable charging and discharging of the cylindrical power battery module are achieved.

Optionally, the third end portion 502 includes third end connection portions 5020 having the corresponding number as conductive units 410 on the same connection piece 400, and the fourth end includes fourth end connection portions 5030 having the corresponding number as conductive units 410 on the same connection piece 400. Four conductive units 4110 are described as an example in the embodiment. Four third end connection portions 5020 are connected to four cell units 100 at the output terminal of the first module, respectively, and four fourth end connection portions 5030 are connected to four cell units 100 at the input terminal of the second module, respectively, so that the series connection between the first module and the second module is achieved.

Optionally, to maintain the overall flatness, the height difference between the third end portion 502 of the connection copper bar 500 and the connection copper bar body 501 and the height difference between the fourth end portion 503 of the connection copper bar 500 and the connection copper bar body 501 fit the height difference between the positive electrode 110 of the cell unit 100 and the negative electrode 120 of the cell unit 100.

Optionally, the thickness of the third end portion 502 and the thickness of the fourth end portion 503 are each less than the thickness of the copper bar body 501. The thickness of the third end portion 502 and the thickness of the fourth end portion 503 each range from 0.2 mm to 0.4 mm, and the thickness of the copper bar body 501 ranges from 3 mm to 5 mm. Exemplarily, the thickness of the third end portion 502 and the thickness of the fourth end portion 503 may be set to 0.2 mm, 0.25 mm, 0.3 mm, 0.35 mm, 0.4 mm, etc. Of course, in other embodiments, the thickness of the third end portion 502 and the thickness of the fourth end portion 503 may also be set as other values within this range. The thickness of the copper bar body 501 is 3 mm, 3.5 mm, 4 mm, 4.5 mm, 5 mm, etc. Of course, in other embodiments, the thickness of the copper bar body 501 may also be set as other values within this range.

Optionally, in some embodiments, the third end portion 502 is set as a planar structure, and the third end portion 502 is provided with a fourth fuse structure. Exemplarily, the fourth fuse structure includes a fourth current limiting hole provided at the third end portion 502, and one or more fourth current limiting holes may be provided according to actual requirements. The arrangement of the fourth current limiting hole reduces the cross-section area of the third end portion 502, so that the third end portion 502 fuses due to the concentration of thermal stress when the circuit is overloaded, the current in the circuit is cut off, the circuit is protected, and the safety performance of the cylindrical power battery is improved. Optionally, the fourth fuse structure further includes low-melting-point metal, such as tin, coated at the third end portion 502. When an extreme situation such as a short circuit occurs in the circuit, the low-melting-point metal melts, and thus the substrate of the third end portion 502 becomes brittle, so that the third end portion 502 can be quickly disconnected at higher response speed; therefore, the circuit is quickly cut off, and the cell units 100 are protected.

In other embodiments, the third end portion 502 is provided with a protruding structure, and the protruding structure of the third end portion 502 is a fourth buffer portion 504. Through the arrangement of the fourth buffer portion 504, a buffer effect is achieved on the expansion force, the tolerance and the displacement between the connection copper bar 500 and the cell units 100, so that the reliability of the connection is relatively high. Optionally, the protruding structure of the third end portion 502 is disposed in a "n" shape and may be manufactured in a pressing manner; this manufacturing method is easy and brings a good buffering effect. Exemplarily, the fourth fuse structure may be disposed at the fourth buffer portion 504. When the circuit temperature becomes too high due to an extreme situation such as a short circuit occurring in the circuit, the fourth fuse structure fuses due to the heat generated by the fourth fuse structure itself, and the circuit connection between the connection copper bar 500 and the positive electrode 110 of the cell unit 100 is quickly disconnected, so that the cell units 100 are protected.

In some embodiments, the fourth end portion 503 is a planar structure. To avoid the positive electrode 110 of the cell unit 100, the fourth end portion 503 of the connection copper bar 500 is provided with a third avoiding groove, and the third avoiding groove is an arc-shaped notch matching the cylindrical protrusion 1100 of the positive electrode 110. With the arrangement of the third avoiding groove, on the one hand, the connection area between the fourth end portion 503 of the connection copper bar 500 and the negative electrode 120 is increased, so that the reliability of the connection between the fourth end portion 503 of the connection copper bar 500 and the negative electrode 120 is improved, and the poor connection is unlikely to occur; on the other hand, the third avoiding groove can also serve as a limit to prevent the connection copper bar 500 from falling off or shifting.

Of course, in other embodiments, in the case where multiple submodules 10 exist, multiple electrical unit groups 30 may also be disposed at intervals in the second direction to satisfy arrangement requirements for different cylindrical power battery modules. The input terminal of the cylindrical power battery module is a cell unit 100 at an end of the first submodule 10 in the second direction, and the output terminal of the cylindrical power battery module is a cell unit 100 at an end of the last submodule 10 in the second direction.

In some embodiments, the multiple electrical unit groups 30 may also be disposed in the third direction. The input terminal of the cylindrical power battery module is a cell unit 100 at an end of the first submodule 10 in the third direction, and the output terminal of the cylindrical power battery module is a cell unit 100 at an end of the last submodule 10 in the third direction. Adaptively, when the multiple submodules 10 are disposed at intervals in the third direction, the third end portion 502 of the connection copper bar 500 and the fourth end portion 503 of the connection copper bar 500 are disposed at intervals in the third direction, so that two submodules 10 disposed at intervals in the third direction can be adaptively connected.

The present application further provides a cylindrical power battery module. The cylindrical power battery module includes the busbar assembly in the preceding solution and at least one submodule 10. A submodule 10 includes multiple cell units 100, and the busbar assembly is configured to connect cell units 100. The internal structure of the cylindrical power battery module is simple, and the circuit connection between multiple cell units 100 in the cylindrical power battery module can be completed through the input copper bar 200, the output copper bar 300 and CCS assemblies 20 having the corresponding number as the at least one submodule 10. The reliability of the connection of the CCS assemblies 20 is relatively high, and the space utilization rate is high, so that the energy density of the cylindrical power battery module is relatively high.

Figure 7:
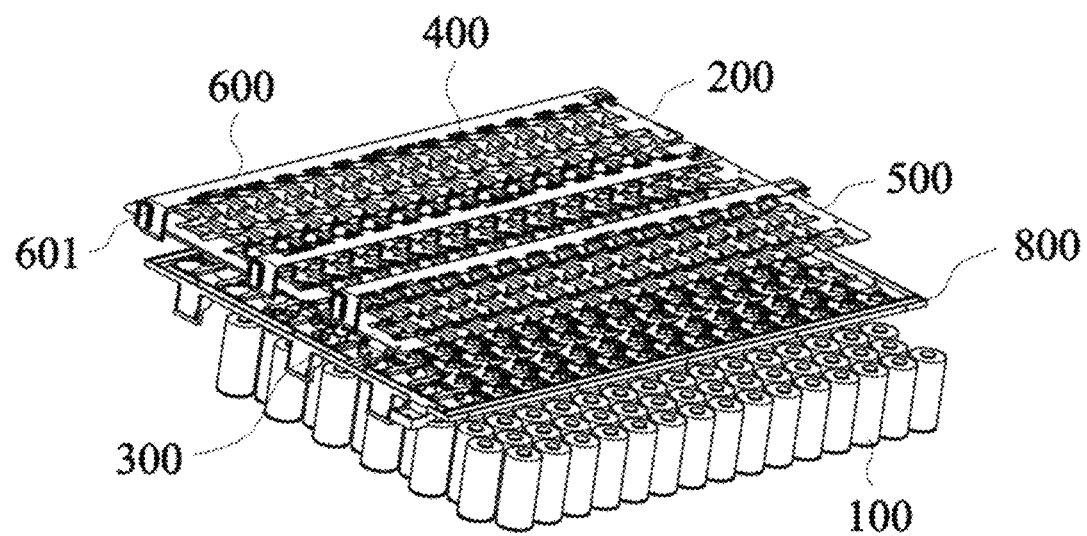
FIG. 7 is a structural view of a cylindrical power battery module according to an embodiment of the present application.

Optionally, referring to FIG. 1 and FIG. 7, the cylindrical power battery module includes a flexible printed circuit (FPC) 600 and a battery management system (BMS). Nickel sheets 602 and an output plug 601 are disposed on the FPC 600. Multiple nickel sheets 602 are disposed, two ends of the multiple nickel sheets 602 are connected to the FPC 600 and the connection piece 400, respectively, and the number of nickel sheets 602 for arrangement may be selected according to actual situations. The output plug 601 is inserted on the BMS, and the voltage acquisition operation of cell units 100 of each submodule 10 may be completed through the FPC 600 and the BMS. The output plug 601 is directly inserted on the BMS, so that the use of patch cords is reduced, the occupied space is relatively small, the installation process is simple, and the labor costs are low, which is conducive to industrialized and efficient production.

Referring to FIG. 1 and FIG. 8, the cylindrical power battery module includes a negative temperature coefficient (NTC) thermistor, and the NTC thermistor is connected to the FPC 600 by welding through the nickel sheets 602. To achieve accurate temperature collection, in the embodiment, an NTC collection point 700 is provided at the top cover of the negative electrode 120 of the cell unit 100 located at the head end of the first module, and the NTC thermistor is attached to the NTC collection point 700. In this manner, the problem of difficult temperature collection of the cylindrical power battery module is solved, and accurate temperature collection of the cell unit 100 is achieved. Of course, in other embodiments, the NTC collection point 700 may be provided at the pole of the positive electrode 110 of the cell unit 100 or in the middle of the cell unit 100 to ensure that the collected temperature of the cell unit 100 is relatively accurate.

With continued reference to FIG. 7, the cylindrical power battery module further includes a plastic bracket 800. The plastic bracket 800 is disposed between the CCS assembly 20 and the cell units 100, and profiling holes are provided on the plastic bracket 800. Through the profiling holes, the input copper bar 200, the output copper bar 300 and the CCS assembly 20 can be positioned and assembled with multiple cell units 100, and the plastic bracket 800 can carry the input copper bar 200, the output copper bar 300 and the CCS assembly 20 and serve for fixing; at the same time, the cell units 100 are integrated with the input copper bar 200, the output copper bar 300 and the CCS assembly 20, so that the number of PACK parts is reduced, the process flow is simple, and the costs are relatively low; meanwhile, the risk of the short circuit between the cell units 100 and the input copper bar 200, the output copper bar 300 and the CCS assembly 20 is reduced, so that the electrical safety of the cylindrical power battery module is ensured.

Optionally, the plastic bracket 800 is integrally formed with a simple process and relatively low costs.

What is claimed is:

1. A busbar assembly for electrical connection of a cylindrical power battery module, wherein the cylindrical power battery module comprises at least one submodule, a submodule of the at least one submodule comprises a plurality of cell units, and the busbar assembly comprises:
an input copper bar, wherein the input copper bar is connected to a cell unit at an input terminal of the cylindrical power battery module;
an output copper bar, wherein the output copper bar is connected to a cell unit at an output terminal of the cylindrical power battery module; and
a cells contact system assembly having a corresponding number as the at least one submodule, wherein one submodule is correspondingly connected to one cells contact system assembly to form an electrical unit group;
wherein at least one of the input copper bar and the output copper bar is a variable cross-section copper bar, the input copper bar and the output copper bar each comprise a first end portion and a second end portion, the first end portion of the input copper bar is connected to the cell unit at the input terminal of the cylindrical power battery module, and the first end portion of the output copper bar is connected to the cell unit at the output terminal of the cylindrical power battery module;

wherein a thickness of the first end portion is less than a thickness of the second end portion.

2. The busbar assembly according to claim 1, wherein the cells contact system assembly comprises at least one connection piece, a connection piece of the at least one connection piece comprises a plurality of conductive units and a plurality of connection portions, conductive units disposed adjacently at intervals in a first direction are connected through connection portions of the plurality of connection portions, the plurality of conductive units are connected in parallel to cell units disposed adjacently in the first direction, and the plurality of conductive units are connected in series to cell units disposed adjacently in a second direction.

3. The busbar assembly according to claim 2, wherein a thickness of the connection piece ranges from 0.2 millimeters to 0.4 millimeters.

4. The busbar assembly according to claim 2, wherein the connection piece comprises a first insulating layer, and the first insulating layer is disposed on one side of the connection piece facing the plurality of cell units.

5. The busbar assembly according to claim 2, wherein the cell unit of the plurality of cell units comprises a positive electrode and a negative electrode, the negative electrode is disposed on an end face of the cell unit, the positive electrode and the negative electrode are disposed on a same side, the positive electrode comprises a cylindrical protrusion, a conductive unit of the plurality of conductive units is provided with a first avoiding groove, and the first avoiding groove is capable of avoiding the cylindrical protrusion.

6. The busbar assembly according to claim 2, wherein a connection portion of the plurality of connection portions is a planar structure; or
a connection portion of the plurality of connection portions is a protruding structure, and the connection portion comprises a second buffer portion;
wherein a second fuse structure is disposed on the connection portion; or
the second buffer portion is provided with a second fuse structure.

7. The busbar assembly according to claim 2, wherein a conductive unit of the plurality of conductive units comprises a first connection region and a second connection region, and the first connection region and the second connection region are connected to two cell units disposed adjacently in the first direction, respectively;
wherein
the first connection region and the second connection region have different heights in a third direction; or
the first connection region comprises a second insulating layer, the second connection region comprises a third insulating layer, the second insulating layer is configured to insulate part other than a connection between the first connection region and a cell unit of the two cell units, and the third insulating layer is configured to insulate part other than a connection between the second connection region and an other cell unit of the two cell units.

8. The busbar assembly according to claim 1, wherein the thickness of the first end portion ranges from 0.2 millimeters to 0.4 millimeters, and the thickness of the second end portion ranges from 3 millimeters and 5 millimeters.

9. The busbar assembly according to 1, wherein the first end portion comprises input connection portions having a corresponding number as conductive units on a same connection piece.

10. The busbar assembly according to claim 1, wherein the first end portion is a planar structure; or
the first end portion is a protruding structure and comprises a third buffer portion;
wherein the first end portion is provided with a third fuse structure; or
a third fuse structure is disposed on the third buffer portion.

11. The busbar assembly according to claim 1, wherein one submodule is provided, the input terminal of the cylindrical power battery module is a cell unit at a first end of the one submodule, and the output terminal of the cylindrical power battery module is a cell unit at a second end of the one submodule.

12. A cylindrical power battery module, comprising a busbar assembly and at least one submodule, wherein each submodule of the at least one submodule comprises a plurality of cell units, and the busbar assembly is configured to connect the plurality of cell units;
the busbar assembly comprises:
an input copper bar, wherein the input copper bar is connected to a cell unit at an input terminal of the cylindrical power battery module;
an output copper bar, wherein the output copper bar is connected to a cell unit at an output terminal of the cylindrical power battery module; and
a cells contact system assembly having a corresponding number as the at least one submodule, wherein one submodule is correspondingly connected to one cells contact system assembly to form an electrical unit group;
wherein at least one of the input copper bar and the output copper bar is a variable cross-section copper bar, the input copper bar and the output copper bar each comprise a first end portion and a second end portion, the first end portion of the input copper bar is connected to the cell unit at the input terminal of the cylindrical power battery module, and the first end portion of the output copper bar is connected to the cell unit at the output terminal of the cylindrical power battery module;
wherein a thickness of the first end portion is less than a thickness of the second end portion.

13. The cylindrical power battery module according to claim 12, comprising a flexible printed circuit and a battery management system, wherein the flexible printed circuit is connected to the cells contact system assembly, the flexible printed circuit is provided with an output plug, and the output plug is inserted on the battery management system.

14. The cylindrical power battery module according to claim 13, comprising a negative temperature coefficient thermistor, wherein the negative temperature coefficient thermistor is disposed on cell units, and the negative temperature thermistor is connected to the flexible printed circuit.

15. The cylindrical power battery module according to claim 12, further comprising a plastic bracket disposed between the cells contact system assembly and cell units, and the plastic bracket is configured to secure the input copper bar, the output copper bar and the cells contact system assembly.

16. The busbar assembly according to claim 2, wherein a conductive unit of the plurality of conductive units is provided with a convex portion, and the convex portion forms a first buffer portion;

wherein a first fuse structure is disposed on the first buffer portion.

* * * * *